United States Patent
Vuillemin et al.

(10) Patent No.: US 9,885,315 B2
(45) Date of Patent: Feb. 6, 2018

(54) TAIL CONE FOR A MICROJET ROTARY TURBINE ENGINE

(71) Applicants: SNECMA, Paris (FR); Centre National De La Recherche Scientifique (CNRS), Paris (FR); UNIVERSITE DE POITIERS, Poitiers (FR); ENSMA, Futuroscope Chasseneuil (FR)

(72) Inventors: Alexandre Alfred Gaston Vuillemin, Moissy-Cramayel (FR); Maxime Koenig, Moissy-Cramayel (FR); Peter Jordan, Rom (FR); Pierre Comte, Poitiers (FR); Yves Gervais, Poitiers (FR)

(73) Assignees: SNECMA, Paris (FR); CENTRE NATIONAL DE LA RECHERCHE SCIENTIFIQUE (CNRS), Paris (FR); UNIVERSITE DE POITIERS, Poitiers (FR); ENSMA, Futuroscope Chasseneuil (FR)

( * ) Notice: Subject to any disclaimer, the term of this patent is extended or adjusted under 35 U.S.C. 154(b) by 418 days.

(21) Appl. No.: 14/326,160

(22) Filed: Jul. 8, 2014

(65) Prior Publication Data

US 2014/0373550 A1    Dec. 25, 2014

Related U.S. Application Data

(63) Continuation of application No. 14/116,648, filed as application No. PCT/FR2015/051054 on May 11, 2012, now abandoned.

(30) Foreign Application Priority Data

May 12, 2011    (FR) ...................... 11 54126

(51) Int. Cl.
F02K 1/34    (2006.01)
F02K 1/46    (2006.01)

(52) U.S. Cl.
CPC . F02K 1/34 (2013.01); F02K 1/46 (2013.01)

(58) Field of Classification Search
CPC ..... F02K 1/28; F02K 1/34; F02K 1/38; F02K 1/46
See application file for complete search history.

(56) References Cited

U.S. PATENT DOCUMENTS 2,526,409 A * 10/1950 Price .................. F02K 3/00
 416/129
2,586,054 A * 2/1952 Jonas ................. B64C 11/48
 244/60

(Continued)

OTHER PUBLICATIONS

The aircraft Gas Turbine Engine and its operation, United Technologies Corporation, Part No. P&W 182408, Aug. 1988, pp. 1-14 to 1-17 and 3-7.*

Primary Examiner — Lorne Meade
(74) Attorney, Agent, or Firm — Oblon, McClelland, Maier & Neustadt, L.L.P.

(57) ABSTRACT

The invention relates to a rear casing for a turbine engine comprising a primary body generating a primary flow (10) to be ejected through a primary nozzle (6), said rear casing (7) being shaped so as to be positioned downstream from the primary body and to define, on the inside of the turbine engine, the path followed by the primary flow downstream from the primary nozzle (6). The tail cone is characterised in that it comprises a connection to a system for supplying a pressurised gas and at least one perforation (8) for injecting the pressurised gas through the perforation and into the primary flow. The casing preferably comprises at least one means for rotating same about the axis of rotation of the mobile elements of the primary body.

11 Claims, 2 Drawing Sheets

(56) References Cited

U.S. PATENT DOCUMENTS

| | | | | |
|---|---|---|---|---|
| 2,847,822 A * | 8/1958 | Hausmann | ............... | B64C 15/02 138/39 |
| 3,308,626 A * | 3/1967 | Nelson | ....................... | F02K 9/78 60/244 |
| 3,332,241 A * | 7/1967 | Coplin | ................. | B64C 29/0058 415/79 |
| 3,484,847 A * | 12/1969 | Horace | ..................... | F02K 1/09 181/215 |
| 3,584,972 A * | 6/1971 | Bratkovich | ............ | B21D 53/78 29/889.721 |
| 3,830,431 A | 8/1974 | Schwartz | | |
| 3,910,375 A | 10/1975 | Hache et al. | | |
| 3,938,742 A | 2/1976 | Corson, Jr. | | |
| 4,240,519 A | 12/1980 | Wynosky | | |
| 4,897,995 A * | 2/1990 | Guirguis | ................ | B63H 11/14 123/19 |
| 6,662,548 B1 * | 12/2003 | Clark | ...................... | F02K 1/386 60/204 |
| 7,395,657 B2 * | 7/2008 | Johnson | ................. | B64D 33/02 244/53 B |
| 8,459,036 B2 * | 6/2013 | Baker | ....................... | F02K 1/15 239/265.15 |
| 9,617,954 B2 * | 4/2017 | Vuillemin | ................. | F02K 1/34 60/226.1 |
| 2004/0187474 A1 | 9/2004 | Martens et al. | | |
| 2004/0237501 A1 | 12/2004 | Brice et al. | | |
| 2005/0109012 A1 | 5/2005 | Johnson | | |
| 2007/0018035 A1 * | 1/2007 | Saiz | ....................... | B64C 15/00 244/12.3 |
| 2008/0302083 A1 | 12/2008 | Sloan et al. | | |
| 2010/0018213 A1 | 1/2010 | Migliaro, Jr. | | |
| 2010/0162684 A1 * | 7/2010 | Baker | ....................... | F02K 1/15 60/226.3 |
| 2010/0242433 A1 | 9/2010 | Prat et al. | | |
| 2014/0245715 A1 * | 9/2014 | Vuillemin | ................. | F02K 1/34 60/226.1 |

* cited by examiner

TAIL CONE FOR A MICROJET ROTARY TURBINE ENGINE

CROSS-REFERENCE TO RELATED APPLICATIONS

The present application is a continuation application of U.S. Ser. No. 14/116,648, filed on Nov. 8, 2013, which is a National Stage application of PCT/FR2012/051054 filed on May 11, 2012, which claims priority to French Application No. 11 54126, filed on May 12, 2011. The entire contents of each of the above applications are incorporated herein by reference.

The field of the present invention is that of turbomachines and more particularly that of the devices for reducing the noise emitted by these turbomachines.

Commercial airliners are generally equipped with bypass turbine engines which consist of a gas turbine driving a ducted fan, the latter generally being positioned upstream of the engine. The mass of air drawn in by the engine is split into a primary stream, which flows through the gas turbine or primary spool, and a secondary stream which comes from the fan, the two streams being concentric. The primary stream leaves the fan to pass through the primary spool where it is compressed once again, heated in a combustion chamber, guided to consecutive turbine stages then ejected as a primary gaseous stream. The secondary or bypass stream is compressed by the ducted fan stage, then ejected directly without having been heated. The two streams may be ejected separately as two concentric flows or alternatively may be mixed in one and the same duct before being ejected.

The turbine engine is conventionally housed in a nacelle which is configured in such a way as to make the aerodynamic drag as low as possible; it comprises a first part, upstream, which envelops the fan and a second part, downstream, which forms a fairing to guide the secondary or bypass stream. The primary stream in its downstream part is guided between an engine cowl, referred to as primary cowl, and a conic case which closes the engine at the rear and which is generally referred to as the tail cone. The nacelle fairing with the primary cowl constitutes an ejection jet pipe for the secondary or bypass stream, while the primary cowl with the tail cone constitutes an ejection jet pipe for the primary stream.

Reducing the noise caused by the jet of turbojet engines is a constant concern to aircraft manufacturers and engine designers and various solutions have been proposed to this end.

One of the measures currently taken is the use of chevrons which are installed on the primary nozzle of the engine. This technology is currently used essentially on engines in which the flows are separate. However, while it is fairly effective from an acoustic standpoint, it does, however, have a negative impact on performance in cruising flight.

Another solution that industry has envisaged is to use microjets on the cowls surrounding the primary stream and/or the secondary bypass stream. These microjets are distributed circularly in azimuth on the cowls and inject air into the corresponding jet, at various angles of incidence and of side slip. However, studies conducted into various devices have shown that the acoustic improvements that can be obtained using control systems of this nature remain limited, a fact that can be attributed to the lack of ability of this external jet control method to influence the zones in which noise is produced, in this instance downstream of the ejection nozzles. The problem is that with devices located on the outside of the jet, notably in the region of the outer lip of the primary nozzle, the disturbances introduced are rapidly assimilated by the turbulence of the layer in which the two streams mix. The impact that these disturbances have on the development of turbulence is therefore derived more from a change in the initial conditions of the mixing layer than from direct action on the downstream zones of the flow, where the main sources of noise are located.

It is an object of the present invention to overcome these disadvantages by proposing a new device for reducing the jet noise of turbojet engines, which performs better than the current devices and which does not impair the cruising performance of these turbojet engines, either in terms of thrust or in terms of specific fuel consumption.

To this end, one subject of the invention is a rear case for a turbine engine comprising a primary spool that generates a primary flow intended to be ejected by a primary nozzle, said rear case being configured to be positioned downstream of said primary spool and to delimit, on the internal side of the turbine engine, the path followed by said primary stream downstream of the primary nozzle, characterized in that it comprises a connection to a pressurized-gas feed system and at least one perforation intended for the injection of this pressurized gas, through this perforation, into said primary stream.

The presence of a perforation on the tail cone of the case makes it possible, by altering the conditions under which a pressurized gas is injected by comparison with the static pressure obtaining in the primary stream, to create a phenomenon of unsteady flow along the tail cone which spreads over the entire length of this cone and beyond, thus reducing the jet noise generated by the primary stream.

Advantageously, the perforation is configured in such a way that the jet passing through it makes an angle of between 20 and 90° with the direction of the primary stream. This orientation aims to cause the jet to penetrate as far as possible into the primary stream and better generate the unsteady flow phenomenon.

In one particular embodiment, the perforation is configured so that the jet is injected at right angles to the surface of said case.

For preference, the case comprises a number of perforations of between 2 and 8, said perforations being evenly distributed about its circumference. A minimum number of two makes it possible to retain symmetry in the configuration adopted and reduce vibration-generating factors, whereas an excessively high number of perforations has, for an equivalent perforation diameter and injection speed, the disadvantage of bleeding off too much air.

In one particular embodiment, the case comprises at least one means for setting it in rotation about the axis of rotation of the moving parts of said primary spool.

Setting the case in rotation creates an unsteady flow phenomenon as a result of the alternation, in a given plane, of a disturbance caused by the passage of the jet and a period of calm which lasts until the next perforation in this plane files past.

The invention also relates to an assembly consisting of a case as described hereinabove and of a pressurized-gas feed system in which the feed system is dimensioned to supply each perforation with a flow rate less than or equal to 0.25% of the flow rate of the primary stream.

In one particular embodiment, the cross section of the perforation and the feed system are dimensioned so that the jet has a speed that is at most sonic as it passes through said perforation.

In one particular embodiment, the case comprises at least one means for setting it in rotation about the axis of rotation of the moving parts of said primary spool and the pressurized-gas feed system delivers a constant pressure.

In another embodiment, the case comprises means of attachment for securing it motionless to said primary spool and the pressure delivered by the feed system is modulated as a function of time.

The invention relates finally to a turbine engine fitted with an assembly as described hereinabove.

The invention will be better understood, and further objects, details, features and advantages thereof will become more clearly apparent during the course of the detailed explanatory description which follows, of one embodiment of the invention provided by way of purely illustrative and nonlimiting example with reference to the attached schematic drawings.

Figure 1:
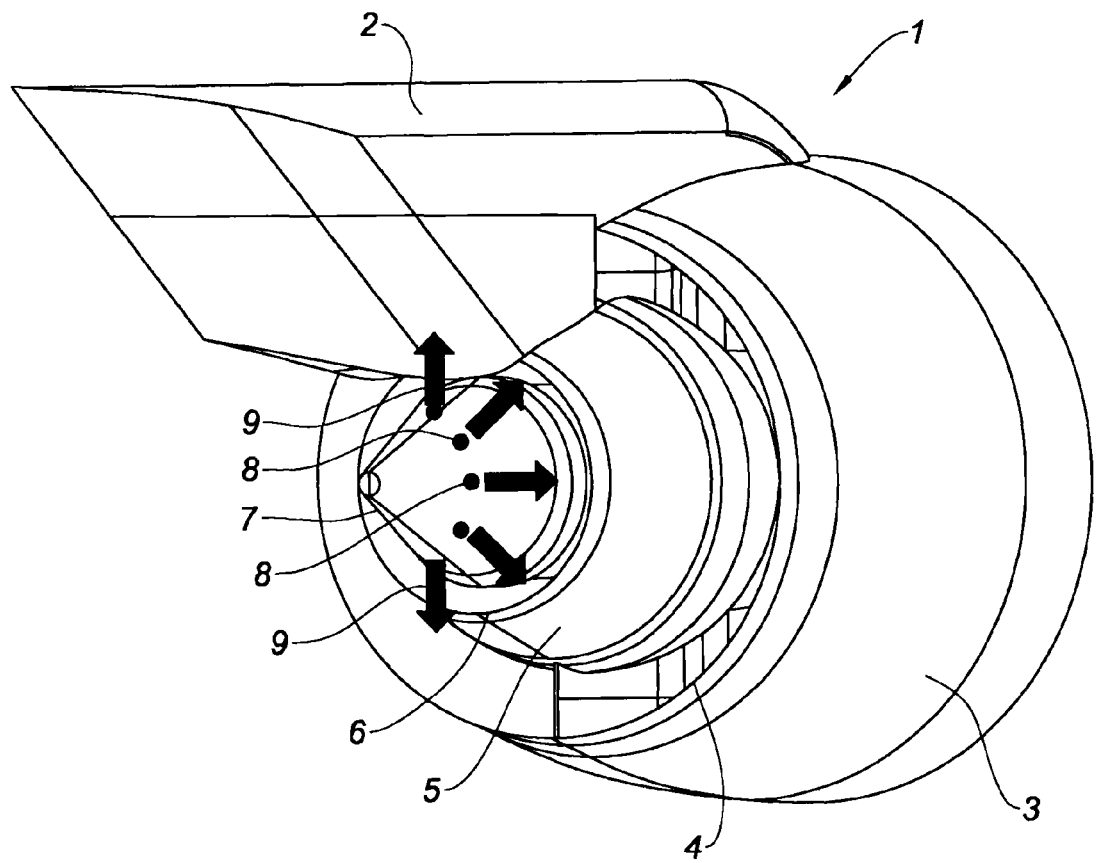
FIG. 1 is a perspective view from the rear of a bypass turbine engine equipped with a noise reduction device according to one embodiment of the invention.

Reference is made to FIG. 1 which shows a bypass turbine engine 1 with a high bypass ratio, mounted on the pylon 2 of an aircraft (not depicted). The turbine engine 1 comprises a nacelle 3 the front part of which surrounds the fan and the rear part of which forms the ejection nozzle 4 for the secondary or bypass stream. The primary spool of the turbojet engine is enclosed in a succession of cases ending at the downstream end in the primary cowl 5 which separates the primary and secondary streams. On the inside, the primary stream is ducted by the tail cone 7, which, with the primary cowl 5, forms the primary stream ejection nozzle 6. The tail cone 7 is pierced with a series of perforations 8 which are evenly distributed about its periphery, downstream of the primary ejection nozzle 6. These perforations 8 are external portions of compressed air injectors, the purpose of which is to inject microjets 9 of pressurized air into the primary stream, are oriented in such a way as to perform this injection in a radial plane, with reference to the axis of rotation of the turbomachine 1. Although this is not apparent from FIG. 1, the tail cone is made to rotate about the axis of rotation of the turbomachine so that the direction of the microjets 9 is constantly being modified.

Figure 2:
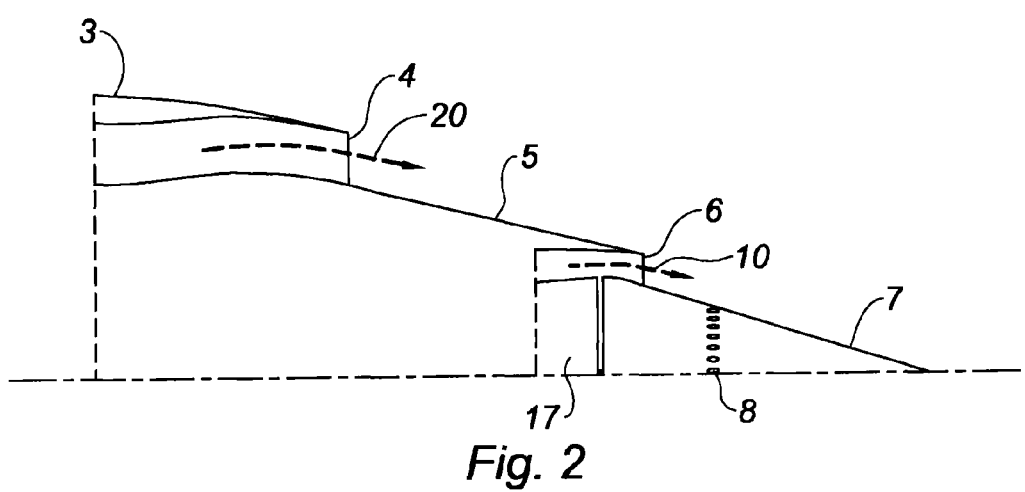
FIG. 2 is a schematic view in cross section of the engine of FIG. 1.

FIG. 2 shows the afterbody of the turbojet engine 1. The downstream end of the nacelle 3 and the primary cowl 5, both of cylindrical shape, duct the secondary or bypass stream 20, while the primary stream 10 is ducted by the internal face of the primary cowl 5 and by the tail cone 7. This figure also shows the perforations 8 made in the external wall of the tail cone 7, which are fed with pressurized air by a feed system not depicted. The tail cone 7 is attached, such that it is capable of rotation, to an internal case 17 which terminates the primary spool at its downstream part.

Figure 3:
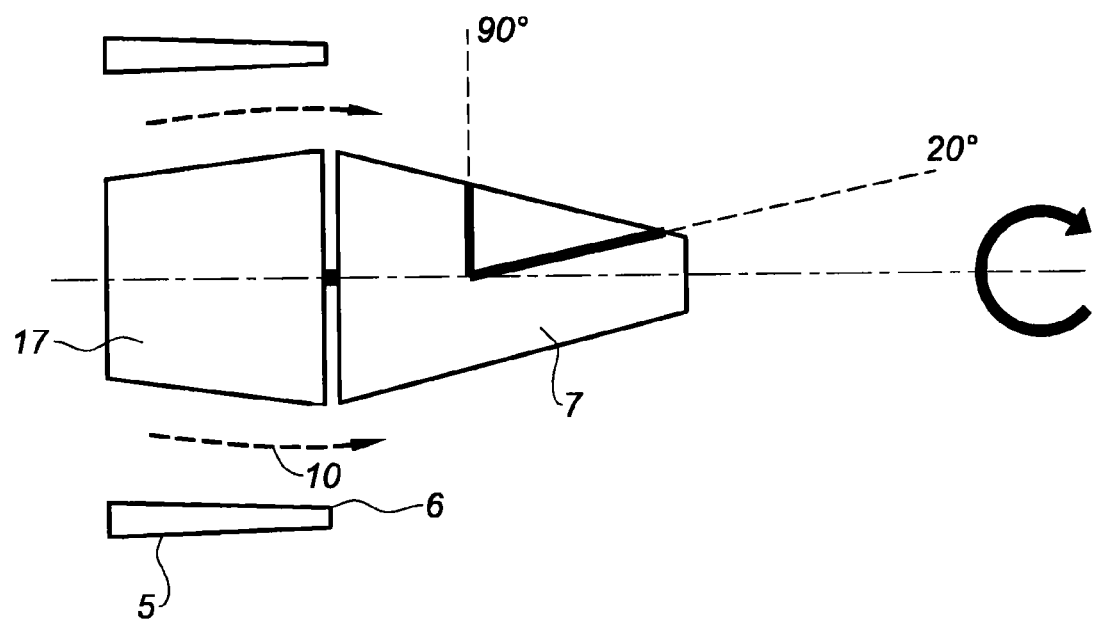
FIG. 3 is a schematic view in cross section of the rear part of the primary spool of the turbine engine of FIG. 1.

FIG. 3 provides a detailed view of the most downstream part of the engine, with the primary stream 10 which is ducted between the primary cowl 5 and the internal case 17. The tail cone 7 is mounted such that it can rotate on this stationary internal case 17 via rotation means such as gearing, rolling bearings and plain bearings, none of which have been depicted. A device, not depicted, for controlling the rotation of the tail cone with respect to the internal case 17 is also provided. This rotation device may, for example, be made up of a reduction gear system driven off one of the turbine shafts of the turbine engine.

FIG. 3 also shows two possible orientations for the microjets 9 which are injected into the primary stream downstream of the primary ejection nozzle 6. In the first case, the microjets are oriented radially, with reference to the axis of rotation of the turbomachine, and in the second case their direction makes an angle of 20° with this axis of rotation. Other angles of injection between these two values are equally possible. In all cases, the jets are injected at a direction and with a momentum which are such that they penetrate deep within the primary stream and do not spread out by immediately mixing with this stream to flow along the wall of the cone 7.

The way in which the device for reducing the noise of a turbojet engine according to the invention works will now be described.

The technology proposed consists mainly in making part of the central spool, in this instance the tail cone 7, rotate and in equipping it with two or more jets of compressed air, which are distributed azimuth-wise on the periphery of the cone and deliver this air continuously. The continuous rotational movement of the jets thus introduces an unsteady component into the jet, because in a given radial plane, the passage of a jet is chronologically succeeded by moments without disturbance. The flow dynamics obtained are therefore closer to those of a wake than to those of a mixing layer. These disturbances introduced into the flow can therefore be expected not to be assimilated too rapidly by the turbulence of the mixing layer and to maintain their coherent nature over a substantial axial extent, or even as far as the end of the potential cone.

The proposed device is also characterized by its extreme simplicity:

it is relatively simple to optimize because it involves only a limited number of parameters, such as the number and position of the perforations 8, the delivery rates of the jets and the rotational speed to be imparted to the tail cone 7.

there is no mechanical component likely to go into vibration, thereby improving the reliability of the device, it requires only a small amount of energy, because of the low mass set in motion, it requires the addition of only a very small number of parts, thus reducing the additional cost in terms of onboard mass, it is installed at the end of the central spool of the engine, in a location where there is unused space, the tail cone generally being empty in the prior art, it requires no modification to the shape of the central spool and therefore does not introduce aerodynamic losses.

In a preferred embodiment, the device is designed with the following particular parameters:

the number of perforations 8 injecting compressed air varies between 2 and 8 according to the diameter of the cone 7. The microjets 9 derived from these perforations are evenly spaced in azimuth, so as to maintain the symmetry of the geometry of the afterbody of the turbojet engine. This respect of symmetry makes it possible to get around some of the vibration problems that could arise with rotating structures.

the angle of penetration of the microjets into the primary stream may, as indicated in FIG. 3, vary between 20° and 90° with respect to the axis of the jet depending on the scenario envisioned. The jets may, in particular, be oriented perpendicular to the wall of the tail cone 7.

the delivery of the microjets 9 is defined as a percentage of the flow rate of the primary stream, allowing the invention to be adapted to suit the size of various existing turbojet engines. After experimentation it is found that these jets remain effective with a flow rate which does not exceed, per perforation 8, a percentage of 0.25% of the primary jet. As a result, even if the cone 7 is equipped with 8 perforations, the flow rate injected by these perforations, and which is bled off the air leaving the compressor, will not exceed 2% of the flow rate of the primary jet. Such a bleed level remains compatible with good engine operation by not excessively impairing its performance in terms of take-off thrust. Outside of take-off phases, and notably during cruising flight, where problems of the noise generated by the turbojet engine are not as keenly felt, provision is made for the noise reduction device to be taken out of operation so that it does not penalize the thermodynamic efficiency or the performance of the jet engine as it did in the systems of the prior art.

the pressure within the injection system feeding the microjets can be set at a value such that the speed of the air of the microjets is at most sonic as it passes through the perforations 8.

the size of the perforations 8 can vary, according to the number of perforations 8 installed on the cone 7 and the injection pressure adopted, from 0.01 m to 0.05 m in diameter.

the rotational speed imparted to the cone 7 is dependent on its size and, therefore, on the size of the engine on which it is mounted. By way of example, on a turbojet engine with a primary cowl 5 diameter of 0.76 m, the cone 7 has a diameter of 0.30 at its widest part and is driven at a speed of 11 000 rpm.

The device according to the invention has been described with a continuous injection of compressed air from a cone set in rotation, this having the effect of creating an unsteady flow of fluid injected into the primary stream 10, the origin of which is positioned at the center of this primary stream. The unsteady nature stems, as already indicated hereinabove, from the alternation, in a given plane, of a disturbance due to the passage of the jet 9 and of a period of calm which lasts until the next perforation 8 in this plane files past. Other devices which perform the same function may be conceived of, and these too fall within the context of the present invention.

By way of example, this unsteady injection could be obtained from rotary annuluses, not attached to a fixed cone 7, but bearing compressed air injectors, which would produce the same effect. It could even be obtained from fixed injectors or by a tail cone 7 that is immobile, by organizing a pulsed modulation of the pressure applied to the air passing through the perforations 8. The pressure modulations would then create the unsteady effect desired and the dynamic effect in the primary stream that generates the noise reduction.

Embodiments:

1. A rear case for a turbine engine comprising a primary spool that generates a primary flow (10) intended to be ejected by a primary nozzle (6), said rear case (7) being configured to be positioned downstream of said primary spool and to delimit, on the internal side of the turbine engine, the path followed by said primary stream downstream of the primary nozzle (6), said case comprising a connection to a pressurized-gas feed system and at least one perforation (8) intended for the injection of this pressurized gas, through this perforation, into said primary stream, characterized in that it comprises at least one means for setting it in rotation about the axis of rotation of the moving parts of said primary spool.

2. The case of 1, in which the perforation (8) is configured in such a way that the jet (9) passing through it makes an angle of between 20 and 90° with the direction of the primary stream (10).

3. The case of 2, in which the perforation (8) is configured so that the jet (9) is injected at right angles to the surface of said case.

4. The case of 1 to 3, comprising a number of perforations (8) of between 2 and 8, said perforations being evenly distributed about its circumference.

5. The case of 1 comprising at least one means for setting it in rotation about the axis of rotation of the moving parts of said primary spool.

6. An assembly consisting of a case of 1 to 5 and of a pressurized-gas feed system in which the feed system is dimensioned to supply each perforation (8) with a flow rate less than or equal to 0.25% of the flow rate of the primary stream.

7. The assembly of 6, in which the cross section of the perforation (8) and the feed system are dimensioned so that the jet (9) has a speed that is at most sonic as it passes through said perforation.

8. An assembly consisting of a case of 1 to 7 and of a pressurized-gas feed system delivering a constant pressure.

9. A turbine engine equipped with an assembly as described in one of 6 to 8.

The invention claimed is:

1. A bypass turbine engine having a longitudinal axis of rotation, said bypass turbine engine comprising:
    a nacelle having a front part surrounding a fan rotatable around said longitudinal axis:
    a bypass stream ejection nozzle located at a downstream end of said nacelle;
    a primary stream ejection nozzle having a trailing edge located at a downstream end of a primary cowl;
    a cylindrical bypass stream duct delimited between the nacelle and the primary cowl;
    a tail cone equipped with a plurality of perforations distributed azimuth-wise on an external wall of the tail cone, the plurality of perforations located downstream of the trailing edge of said primary stream ejection nozzle; and
    a cylindrical primary stream duct delimited between the primary cowl and the tail cone, wherein each perforation of the plurality of perforations in the tail cone is configured to jet compressed air into a primary stream downstream of said primary stream ejection nozzle; wherein said tail cone is rotatable around said longitudinal axis.

2. The bypass turbine engine of claim 1 that when in operation produces less noise than an otherwise identical engine that does not have a tail cone equipped with said plurality of perforations.

3. The bypass turbine engine of claim 1, wherein the tail cone has between 2 and 8 perforations of the plurality of perforations evenly distributed about the circumference of the tail cone.

4. The bypass turbine engine of claim 1, wherein each perforation of the plurality of perforations directs the compressed air outward at an angle of 20° to 90° with respect to the longitudinal axis.

5. The bypass turbine engine of claim 1, wherein each perforation of the plurality of perforations directs the compressed air outward at an angle of 90° with respect to the longitudinal axis.

6. The bypass turbine engine of claim 1, wherein the compressed air injected through each perforation of the plurality of perforations does not exceed 0.25% of a flow rate of the primary stream.

7. The bypass turbine engine of claim 1, wherein the compressed air is injected through each perforation of the plurality of perforations at a speed that is at most sonic.

8. The bypass turbine engine of claim 1, wherein the compressed air is injected at a constant pressure.

9. The bypass turbine engine of claim 1, further comprising a primary spool enclosed within the primary cowl.

10. The bypass turbine engine of claim 1, wherein the primary stream ejection nozzle comprises an upstream portion of the tail cone and a downstream portion of the primary cowl.

11. A bypass turbine engine having a longitudinal axis of rotation, said bypass turbine engine comprising:
- a tail cone equipped with a plurality of perforations distributed azimuth-wise on an external wall of the tail cone, the plurality of perforations located downstream of a trailing edge of a primary stream ejection nozzle of the bypass turbine engine, and
- wherein each perforation of the plurality of perforations is configured to jet compressed air outward at an angle of 90° with respect to the longitudinal axis, the compressed air bled from a compressor of said bypass turbine engine, wherein said tail cone is rotatable around said longitudinal axis.

* * * * *

UNITED STATES PATENT AND TRADEMARK OFFICE
CERTIFICATE OF CORRECTION

PATENT NO. : 9,885,315 B2  
APPLICATION NO. : 14/326160  
DATED : February 6, 2018  
INVENTOR(S) : Alexandre Alfred Gaston Vuillemin et al.

Page 1 of 1

It is certified that error appears in the above-identified patent and that said Letters Patent is hereby corrected as shown below:

In the Claims

Column 6, Line 37, Claim 1 change "longitudinal axis:" to --longitudinal axis;--.

Signed and Sealed this  
Fourteenth Day of April, 2020

Andrei Iancu  
*Director of the United States Patent and Trademark Office*